(12) United States Patent
Vavrus

(10) Patent No.: US 7,783,417 B2
(45) Date of Patent: Aug. 24, 2010

(54) METHODS AND APPARATUS FOR DETERMINING A ROUTE HAVING AN ESTIMATED MINIMUM FUEL USAGE FOR A VEHICLE

(75) Inventor: Jon Vavrus, Claremont, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 271 days.

(21) Appl. No.: 11/684,301

(22) Filed: Mar. 9, 2007

(65) Prior Publication Data
US 2008/0221787 A1 Sep. 11, 2008

(51) Int. Cl.
*G01C 21/00* (2006.01)
(52) U.S. Cl. .......................... 701/200; 701/201; 701/213
(58) Field of Classification Search .................. 701/200, 701/201, 213, 231
See application file for complete search history.

(56) References Cited

U.S. PATENT DOCUMENTS

| 5,515,283 | A | 5/1996 | Desai et al. |
|---|---|---|---|
| 5,742,922 | A | 4/1998 | Kim |
| 5,802,492 | A | 9/1998 | DeLorme et al. |
| 6,067,502 | A | 5/2000 | Hayashida et al. |
| 6,078,864 | A | 6/2000 | Long et al. |
| 6,081,609 | A | 6/2000 | Narioka |
| 6,084,989 | A | 7/2000 | Eppler |
| 6,092,076 | A | 7/2000 | McDonough et al. |
| 6,107,944 | A | 8/2000 | Behr et al. |
| 6,108,603 | A | 8/2000 | Karunanidhi |
| 6,108,604 | A | 8/2000 | Fukaga et al. |
| 6,115,669 | A | 9/2000 | Watanabe et al. |
| 6,124,826 | A | 9/2000 | Garthwaite et al. |
| 6,125,326 | A | 9/2000 | Ohmura et al. |
| 6,141,621 | A | 10/2000 | Piwowarski et al. |
| 6,148,261 | A | 11/2000 | Obradovich et al. |
| 6,151,552 | A | 11/2000 | Koizumi et al. |
| 6,154,699 | A | 11/2000 | Williams |
| 6,163,269 | A | 12/2000 | Millington et al. |
| 6,172,641 | B1 | 1/2001 | Millington |
| 6,175,801 | B1 | 1/2001 | Millington |
| 6,177,943 | B1 | 1/2001 | Margolin |

(Continued)

FOREIGN PATENT DOCUMENTS

JP 2001194172 7/2001

(Continued)

OTHER PUBLICATIONS

PCT/US08/50759—International Search Report (mailed May 9, 2008).

(Continued)

*Primary Examiner*—Mark Hellner
(74) *Attorney, Agent, or Firm*—Winston Hsu

(57) ABSTRACT

Apparatus, methods, processors and computer readable media for determining a suggested route having an estimated minimum fuel usage for a vehicle based on a estimated fuel efficiency for the vehicle for different speeds of the vehicle and based on estimated speeds for the route. The estimated fuel efficiency for the vehicle is based on aggregated data for the vehicle. Alternatively, the estimated fuel efficiency is based on actual data for the vehicle. In some embodiments, suggested routes are constrained by user route preferences, and real-time route information. Alternatively or additionally, the estimated fuel usage is based on actual driver behavior data.

20 Claims, 5 Drawing Sheets

U.S. PATENT DOCUMENTS

| | | | |
|---|---|---|---|
| 6,178,380 B1 | 1/2001 | Millington | |
| 6,184,823 B1 | 2/2001 | Smith et al. | |
| 6,189,130 B1 | 2/2001 | Gofman et al. | |
| 6,201,540 B1 | 3/2001 | Gallup et al. | |
| 6,204,778 B1 | 3/2001 | Bergan et al. | |
| 6,205,397 B1 | 3/2001 | Eslambolchi et al. | |
| 6,212,474 B1 | 4/2001 | Fowler et al. | |
| 6,223,118 B1 | 4/2001 | Kobayashi et al. | |
| 6,229,546 B1 | 5/2001 | Lancaster et al. | |
| 6,249,740 B1 | 6/2001 | Ito et al. | |
| 6,252,814 B1 | 6/2001 | Polidi et al. | |
| 6,253,151 B1 | 6/2001 | Ohler et al. | |
| 6,256,029 B1 | 7/2001 | Millington | |
| 6,278,942 B1 | 8/2001 | McDonough | |
| 6,308,134 B1 | 10/2001 | Croyle et al. | |
| 6,320,517 B1 | 11/2001 | Yano et al. | |
| 6,321,158 B1 | 11/2001 | DeLorme et al. | |
| 6,349,257 B1 | 2/2002 | Liu et al. | |
| 6,356,210 B1 | 3/2002 | Ellis | |
| 6,360,167 B1 | 3/2002 | Millington et al. | |
| 6,362,751 B1 | 3/2002 | Upparapalli | |
| 6,363,322 B1 | 3/2002 | Millington | |
| 6,370,475 B1 | 4/2002 | Breed et al. | |
| 6,377,278 B1 | 4/2002 | Cutright et al. | |
| 6,381,536 B1 | 4/2002 | Satoh et al. | |
| 6,385,535 B2 | 5/2002 | Ohishi et al. | |
| 6,385,542 B1 | 5/2002 | Millington | |
| 6,397,145 B1 | 5/2002 | Millington | |
| 6,405,130 B1 | 6/2002 | Piwowarski | |
| 6,408,243 B1 | 6/2002 | Yofu | |
| 6,427,115 B1 | 7/2002 | Sekiyama | |
| 6,430,501 B1 | 8/2002 | Slominski | |
| 6,453,235 B1 | 9/2002 | Endo et al. | |
| 6,484,089 B1 | 11/2002 | Millington | |
| 6,487,494 B2 | 11/2002 | Odinak et al. | |
| 6,515,595 B1 | 2/2003 | Obradovich et al. | |
| 6,529,822 B1 | 3/2003 | Millington et al. | |
| 6,529,824 B1 | 3/2003 | Obradovich et al. | |
| 6,539,301 B1 | 3/2003 | Shirk | |
| 6,565,610 B1 | 5/2003 | Wang et al. | |
| 6,574,551 B1 | 6/2003 | Maxwell et al. | |
| 6,609,062 B2 | 8/2003 | Hancock | |
| 6,631,322 B1 | 10/2003 | Arthur et al. | |
| 6,671,617 B2 | 12/2003 | Odinak et al. | |
| 6,704,649 B2 | 3/2004 | Miyahara | |
| 6,728,608 B2 | 4/2004 | Ollis et al. | |
| 6,728,636 B2 | 4/2004 | Kokojima et al. | |
| 6,748,323 B2 | 6/2004 | Lokshin et al. | |
| 6,765,554 B2 | 7/2004 | Millington | |
| 6,774,932 B1 | 8/2004 | Ewing | |
| 6,782,319 B1 | 8/2004 | McDonough | |
| 6,816,596 B1 | 11/2004 | Peinado et al. | |
| 6,819,301 B2 | 11/2004 | Nagamatsu et al. | |
| 6,842,695 B1 | 1/2005 | Tu | |
| 6,873,907 B1 | 3/2005 | Millington et al. | |
| 6,885,874 B2 | 4/2005 | Grube et al. | |
| 6,917,982 B1 | 7/2005 | Dueck et al. | |
| 6,938,028 B1 | 8/2005 | Ito | |
| 7,031,834 B2 | 4/2006 | Ito et al. | |
| 7,031,836 B2 | 4/2006 | Branch | |
| 7,058,504 B2 | 6/2006 | McDonough et al. | |
| 7,170,518 B1 | 1/2007 | Millington et al. | |
| 7,233,860 B2 | 6/2007 | Lokshin et al. | |
| 7,260,475 B2 | 8/2007 | Suzuki | |
| 7,321,826 B2 | 1/2008 | Sheha et al. | |
| 7,333,820 B2 | 2/2008 | Sheha et al. | |
| 7,343,242 B2 | 3/2008 | Breitenberger et al. | |
| 7,353,107 B2 | 4/2008 | Breitenberger et al. | |
| 7,379,812 B2 | 5/2008 | Yoshioka et al. | |
| 7,421,334 B2 | 9/2008 | Dahlgren | |
| 7,512,487 B1* | 3/2009 | Golding et al. | 701/202 |
| 7,546,202 B2 | 6/2009 | Oh | |
| 7,590,490 B2 | 9/2009 | Clark | |
| 2001/0018628 A1* | 8/2001 | Jenkins et al. | 701/35 |
| 2002/0151315 A1 | 10/2002 | Hendrey | |
| 2003/0036842 A1 | 2/2003 | Hancock | |
| 2003/0036848 A1 | 2/2003 | Sheha et al. | |
| 2003/0167120 A1 | 9/2003 | Kawasaki | |
| 2003/0182052 A1 | 9/2003 | DeLorme et al. | |
| 2003/0191578 A1 | 10/2003 | Paulauskas et al. | |
| 2004/0049339 A1* | 3/2004 | Kober et al. | 701/209 |
| 2005/0021226 A1* | 1/2005 | Kustosch | 701/205 |
| 2005/0107948 A1 | 5/2005 | Catalinotto | |
| 2006/0080031 A1 | 4/2006 | Cooper et al. | |
| 2006/0089788 A1 | 4/2006 | Laverty | |
| 2006/0106534 A1 | 5/2006 | Kawamata et al. | |
| 2006/0212217 A1 | 9/2006 | Sheha et al. | |
| 2006/0265422 A1 | 11/2006 | Ando et al. | |
| 2007/0027628 A1 | 2/2007 | Geelen | |
| 2007/0073480 A1 | 3/2007 | Singh | |
| 2007/0088494 A1 | 4/2007 | Rothman et al. | |
| 2007/0130153 A1 | 6/2007 | Nachman et al. | |
| 2007/0204218 A1 | 8/2007 | Weber et al. | |
| 2007/0213929 A1 | 9/2007 | Tanizaki et al. | |
| 2007/0233384 A1 | 10/2007 | Lee et al. | |
| 2008/0076451 A1 | 3/2008 | Sheha et al. | |
| 2008/0125958 A1* | 5/2008 | Boss et al. | 701/123 |
| 2008/0133120 A1* | 6/2008 | Romanick | 701/123 |
| 2008/0134088 A1 | 6/2008 | Tse et al. | |
| 2008/0177470 A1 | 7/2008 | Sutardja | |
| 2008/0270016 A1* | 10/2008 | Proietty et al. | 701/123 |
| 2009/0138190 A1 | 5/2009 | Kulik | |
| 2009/0150064 A1 | 6/2009 | Geelen | |
| 2009/0171584 A1 | 7/2009 | Liu | |
| 2009/0177360 A1* | 7/2009 | Kustosch | 701/45 |
| 2009/0182498 A1 | 7/2009 | Seymour | |
| 2009/0182500 A1 | 7/2009 | Dicke | |
| 2009/0187340 A1 | 7/2009 | Vavrus | |
| 2009/0187341 A1 | 7/2009 | Vavrus | |
| 2009/0187342 A1 | 7/2009 | Vavrus | |

FOREIGN PATENT DOCUMENTS

| | | |
|---|---|---|
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040063088 A | 7/2004 |
| KR | 20040106688 | 12/2004 |
| KR | 20060028237 A | 3/2006 |
| KR | 20060101929 A | 9/2006 |
| KR | 20070080726 | 8/2007 |

OTHER PUBLICATIONS

PCT/US08/50759—Written Opinion (mailed May 9, 2008).

Transaction History of U.S. Appl. No. 12/195,152, filed Aug. 20, 2008, entitled "Systems and Methods for Smart City Search."

Transaction History of U.S. Appl. No. 61/122,640, filed Dec. 15, 2008, entitled "Systems and Methods for Providing Global Navigation Satellite System Assisted Maneuvering Guidance to a Vehicle Operator."

International Patent Application No. PCT/US2008/084659, Written Opinion and International Search Report, Apr. 28, 2009.

International Patent Application No. PCT/US2009/030177, Written Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.

Transaction History of related U.S. Appl. No. 08/713,627, filed Sep. 13, 1996, entitled "Navigation System With User Definable Cost Values," now U.S. Patent No. 5,878,368.

Transaction History of related U.S. Appl. No. 08/762,012, filed Dec. 11, 1996, entitled "Navigation System With Forward Looking Origin Selection for Route Re-Calculation," now U.S. Patent No. 6,405,130.

Transaction History of related U.S. Appl. No. 09/037,772, filed Mar. 10, 1998, entitled "Navigation System Character Input Device," now U.S. Patent No. 6,037,942.

Transaction History of relatedU.S. Appl. No. 09/056,218, filed Apr. 7, 1998, entitled "Navigation System using Position Network for Map Matching," now U.S. Patent No. 6,108,603.

Transaction History of related U.S. Appl. No. 09/062,518, filed Apr. 17, 1998, entitled "3-Dimensional Intersection Display for Vehicle Navigation System," now U.S. Patent No. 6,611,753.

Transaction History of related U.S. Appl. No. 09/096,103, filed Jun. 11, 1998, entitled "Navigation System With a Route Exclusion List System," now U.S. Patent No. 6,362,751.

Transaction History of related U.S. Appl. No. 09/099,963, filed Jun. 19, 1998, entitled "Autoscaling of Recommended Route," now U.S. Patent No. 6,574,551.

Transaction History of related U.S. Appl. No. 09/100,683, filed Jun. 19, 1998, entitled "Navigation System Map Panning Directional Indicator," now U.S. Patent No. 6,175,801.

Transaction History of related U.S. Appl. No. 09/114,670, filed Jul. 13, 1998, entitled "Navigation System Vehicle Location Display," now U.S. Patent No. 6,049,755.

Transaction History of related U.S. Appl. No. 09/118,030, filed Jul. 17, 1998, entitled "Navigation System With Predetermined Indication of Next Maneuver," now U.S. Patent No. 6,078,684.

Transaction History of related U.S. Appl. No. 09/160,068, filed Sep. 24, 1998, entitled "Navigation System With Anti-Alias Map Display," now U.S. Patent No. 6,163,269.

Transaction History of related U.S. Appl. No. 09/176,630, filed Oct. 22, 1998, entitled "Street Identification for a Map Zoom of a Navigation System," now U.S. Patent No. 6,178,380.

Transaction History of related U.S. Appl. No. 09/239,692, filed Jan. 29, 1999, entitled "Vehicle Navigation System With Location Based Multi-Media Annotation," now U.S. Patent No. 6,360,167.

Transaction History of related U.S. Appl. No. 09/418,749, filed Oct. 15, 1999, entitled "Navigation System With Road Condition Sampling," now U.S. Patent No. 6,484,089.

Transaction History of related U.S. Appl. No. 09/435,381, filed Nov. 5, 1999, entitled "Navigation System Character Input Device," now U.S. Patent No. 6,765,554.

Transaction History of related U.S. Appl. No. 09/470,438, filed Dec. 22, 1999, entitled "Navigation System With All Character Support," now U.S. Patent No. 6,256,029.

Transaction History of related U.S. Appl. No. 09/470,441, filed Dec. 22, 1999, entitled "Navigation System With Unique Audio Tones for Maneuver Notification," now U.S. Patent No. 6,363,322.

Transaction History of related U.S. Appl. No. 09/487,654, filed Jan. 19, 2000, entitled "Navigation System With Route Indicators," now U.S. Patent No. 6,430,501.

Transaction History of related U.S. Appl. No. 09/519,143, filed Mar. 6, 2000, entitled "Navigation System With Complex Maneuver Instruction," now U.S. Patent No. 6,397,145.

Transaction History of related U.S. Appl. No. 09/535,733, filed Mar. 27, 2000, entitled "Selective Rendering of Cartographic Entities for Navigation System," now U.S. Patent No. 7,170,518.

Transaction History of related U.S. Appl. No. 09/547,004, filed Apr. 11, 2000, entitled "Navigation System With Zoomed Maneuver Instruction," now U.S. Patent No. 6,529,822.

Transaction History of related U.S. Appl. No. 09/661,982, filed Sep. 18, 2000, entitled "Points of Interest for Navigation System," now U.S. Patent No. 6,374,180.

Transaction History of related U.S. Appl. No. 09/679,671, filed Oct. 5, 2000, entitled "Navigation System With Run-Time Training Instruction," now abandoned.

Transaction History of related U.S. Appl. No. 09/691,531, filed Oct. 18, 2000, entitled "Multiple Configurations for a Vehicle Navigation System," now U.S. Patent No. 6,385,542.

Transaction History of related U.S. Appl. No. 09/799,876, filed Mar. 6, 2001, entitled "Navigation System With Figure of Merit Determination," now U.S. Patent No. 6,741,928.

Transaction History of related U.S. Appl. No. 10/088,017, filed Sep. 9, 2002, entitled "Navigation System With User Interface," now U.S. Patent No. 6,873,907.

Transaction History of related U.S. Appl. No. 10/208,261, filed Jul. 31, 2002, entitled "Displaying Data," now U.S. Patent No. 6,748,323.

Transaction History of related U.S. Appl. No. 10/619,619, filed Jul. 16, 2003, entitled "Intelligent Modular Navigation Information Capability," now U.S. Patent No. 7,233,860.

Transaction History of related U.S. Appl. No. 11/327,450, filed Jan. 9, 2006, entitled "Smart Detour."

Transaction History of related U.S. Appl. No. 11/518,205, filed Sep. 11, 2006, entitled "Method and System of Securing Content and Destination of Digital Download Via the Internet."

Transaction History of related U.S. Appl. No. 11/675,817, filed Feb. 16, 2007, entitled "A Method of Generating Curved Baseline for Map Labeling."

Transaction History of related U.S. Appl. No. 11/737,125, filed Apr. 18, 2007, entitled "Method and System Navigation Using GPS Velocity Vector."

Transaction History of related U.S. Appl. No. 11/740,280, filed Apr. 25, 2007, entitled "Adjusting Spatial Operations Based on Map Density."

Transaction History of related U.S. Appl. No. 11/840,610, filed Aug. 17, 2007, entitled "Methods and Apparatus for Measuring the Effectiveness of Advertisements Presented on a Mobile Navigation Device."

Transaction History of related U.S. Appl. No. 11/844,321, filed Aug. 23, 2007, entitled "Rerouting in Vehicle Navigation Systems."

Transaction History of related U.S. Appl. No. 11/852,973, filed Sep. 10, 2007, entitled "Nearest Neighbor Geographic Search."

Transaction History of related U.S. Appl. No. 11/906,277, filed Oct. 1, 2007, entitled "Static and Dynamic Contours."

Transaction History of related U.S. Appl. No. 11/945,211, filed Nov. 26, 2007, entitled "System and Method of Providing Traffic Data to a Mobile Device."

Transaction History of related U.S. Appl. No. 11/967,889, filed Jan. 1, 2008, entitled "System and Method for Accessing a Navigation System."

Transaction History of related U.S. Appl. No. 12/013,384, filed Jan. 11, 2008, entitled "System and Method to Provide Navigational Assistance Using an Online Social Network."

Transaction History of related U.S. Appl. No. 12/016,949, filed Jan. 18, 2008, entitled "Method and Apparatus for Hybrid Routing Using Breadcrumb Paths."

Transaction History of related U.S. Appl. No. 12/016,980, filed Jan. 18, 2008, entitled "Method and Apparatus to Search for Local Parking."

Transaction History of related U.S. Appl. No. 12/016,982, filed Jan. 18, 2008, entitled "Method and Apparatus for Access Point Recording Using a Position Device."

Transaction History of related U.S. Appl. No. 12/188,139, filed Aug. 7, 2008, entitled "System and Method to Record a Present Trip."

Transaction History of related U.S. Appl. No. 12/192,018, filed Aug. 14, 2008, entitled "Route Navigation via a Proximity Point."

Transaction History of related U.S. Appl. No. 12/195,152, filed Aug. 20, 2008, entitled "Systems and Methods for Smart City Search."
International Patent Application Serial No. PCT/US2009/030176, Written Opinion and International Search Report, mailed Sep. 1, 2009.
USPTO Tranaction History of related U.S. Appl. No. 08/691,663, filed Aug. 2, 1996, entitled "Method Providing a Textual Description of a Remote Vehicle Location," now U.S. Patent No. 6,141,621.
USPTO Transaction History of related U.S. Appl. No. 08/691,727, filed Aug. 2, 1996, entitled "System and Method for Controlling a Vehicle Emergency Response Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of relatedd U.S. Appl. No. 08/713,625, filed Sep. 13, 1996, entitled "Navigation System With Vehicle Service Information," now U.S. Patent No. 5,819,201.
USPTO Transaction History of related U.S. Appl. No. 08/713,627, filed Sep. 13, 1996, entitled "Navigation System With User Definable Cost Values," now U.S. Patent No. 5,878,368.
USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.
USPTO Transaction History of related U.S. Appl. No. 09/037,772, filed Mar. 10, 1998, entitled "Navigation System Character Input Device," now U.S. Patent No. 6,037,942.
USPTO Transaction History of related U.S. Appl. No. 09/056,218, filed Apr. 7, 1998, entitled "Navigation System using Position Network for Map Matching," now U.S. Patent No. 6,108,603.
USPTO Transaction History of related U.S. Appl. No. 09/062,518, filed Apr. 17, 1998, entitled "3-Dimensional Intersection Display for Vehicle Navigation System," now U.S. Patent No. 6,611,753.
USPTO Transaction History of related U.S. Appl. No. 09/096,103, filed Jun. 11, 1998, entitled "Navigation System With a Route Exclusion List System," now U.S. Patent No. 6,362,751.
USPTO Transaction History of related U.S. Appl. No. 09/099,963, filed Jun. 19, 1998, entitled "Autoscaling of Recommended Route," now U.S. Patent No. 6,574,551.
USPTO Transaction History of related U.S. Appl. No. 09/100,683, filed Jun. 19, 1998, entitled "Navigation System Map Panning Directional Indicator," now U.S. Patent No. 6,175,801.
USPTO Transaction History of related U.S. Appl. No. 09/114,670, filed Jul. 13, 1998, entitled "Navigation System Vehicle Location Display," now U.S. Patent No. 6,049,755.
USPTO Transaction History of related U.S. Appl. No. 09/118,030, filed Jul. 17, 1998, entitled "Navigation System With Predetermined Indication of Next Maneuver," now U.S. Patent No. 6,078,684.
USPTO Transaction History of related U.S. Appl. No. 09/160,068, filed Sep. 24, 1998, entitled "Navigation System With Anti-Alias Map Display," now U.S. Patent No. 6,163,269.
USPTO Transaction History of related U.S. Appl. No. 09/176,630, filed Oct. 22, 1998, entitled "Street Identification for a Map Zoom of a Navigation System," now U.S. Patent No. 6,178,380.
USPTO Transaction History of related U.S. Appl. No. 09/239,692, filed Jan. 29, 1999, entitled "Vehicle Navigation System With Location Based Multi-Media Annotation," now U.S. Patent No. 6,360,167.
USPTO Transaction History of related U.S. Appl. No. 09/418,749, filed Oct. 15, 1999, entitled "Navigation System With Road Condition Sampling," now U.S. Patent No. 6,484,089.
USPTO Transaction History of related U.S. Appl. No. 09/435,381, filed Nov. 5, 1999, entitled "Navigation System Character Input Device," now U.S. Patent No. 6,765,554.
USPTO Transaction History of related U.S. Appl. No. 09/470,438, filed Dec. 22, 1999, entitled "Navigation System With All Character Support," now U.S. Patent No. 6,256,029.
USPTO Transaction History of related U.S. Appl. No. 09/470,441, filed Dec. 22, 1999, entitled "Navigation System With Unique Audio Tones for Maneuver Notification," now U.S. Patent No. 6,363,322.

USPTO Transaction History of related U.S. Appl. No. 09/487,654, filed Jan. 19, 2000, entitled "Navigation System With Route Indicators," now U.S. Patent No. 6,430,501.
USPTO Transaction History of related U.S. Appl. No. 09/519,143, filed Mar. 6, 2000, entitled "Navigation System With Complex Maneuver Instruction," now U.S. Patent No. 6,397,145.
USPTO Transaction History of related U.S. Appl. No. 09/535,733, filed Mar. 27, 2000, entitled "Selective Rendering of Cartographic Entities for Navigation System," now U.S. Patent No. 7,170,518.
USPTO Transaction History of related U.S. Appl. No. 09/547,004, filed Apr. 11, 2000, entitled "Navigation System With Zoomed Maneuver Instruction," now U.S. Patent No. 6,529,822.
USPTO Transaction History of related U.S. Appl. No. 09/661,982, filed Sep. 18, 2000, entitled "Points of Interest for Navigation System," now U.S. Patent No. 6,374,180.
USPTO Transaction History of related U.S. Appl. No. 09/679,671, filed Oct. 5, 2000, entitled "Navigation System With Run-Time Training Instruction," now abandoned.
USPTO Transaction History of related U.S. Appl. No. 09/691,531, filed Oct. 18, 2000, entitled "Multiple Configurations for a Vehicle Navigation System," now U.S. Patent No. 6,385,542.
USPTO Transaction History of related U.S. Appl. No. 09/799,876, filed Mar. 6, 2001, entitled "Navigation System With Figure of Merit Determination," now U.S. Patent No. 6,741,928.
USPTO Transaction History of related U.S. Appl. No. 10/088,017, filed Sep. 9, 2002, entitled "Navigation System With User Interface," now U.S. Patent No. 6,873,907.
USPTO Transaction History of related U.S. Appl. No. 10/208,261, filed Jul. 31, 2002, entitled "Displaying Data," now U.S. Patent No. 6,748,323.
USPTO Transaction History of related U.S. Appl. No. 10/619,619, filed Jul. 16, 2003, entitled "Intelligent Modular Navigation Information Capability," now U.S. Patent No. 7,233,860.
USPTO Transaction History of related U.S. Appl. No. 11/327,450, filed Jan. 9, 2006, entitled "Smart Detour."
USPTO Transaction History of related U.S. Appl. No. 11/518,205, filed Sep. 11, 2006, entitled "Method and System of Securing Content and Destination of Digital Download Via the Internet."
USPTO Transaction History of related U.S. Appl. No. 11/675,817, filed Feb. 16, 2007, entitled "A Method of Generating Curved Baseline for Map Labeling."
USPTO Transaction History of related U.S. Appl. No. 11/737,125, filed Apr. 18, 2007, entitled "Method and System Navigation Using GPS Velocity Vector."
USPTO Transaction History of related U.S. Appl. No. 11/740,280, filed Apr. 25, 2007, entitled "Adjusting Spatial Operations Based on Map Density."
USPTO Transaction History of related U.S. Appl. No. 11/840,610, filed Aug. 17, 2007, entitled "Methods and Apparatus for Measuring the Effectiveness of Advertisements Presented on a Mobile Navigation Device."
USPTO Transaction History of related U.S. Appl. No. 11/844,321, filed Aug. 23, 2007, entitled "Rerouting in Vehicle Navigation Systems."
USPTO Transaction History of related U.S. Appl. No. 11/852,973, filed Sep. 10, 2007, entitled "Nearest Neighbor Geographic Search."
USPTO Transaction History of related U.S. Appl. No. 11/906,277, filed Oct. 1, 2007, entitled "Static and Dynamic Contours."
USPTO Transaction History of related U.S. Appl. No. 11/945,211, filed Nov. 26, 2007, entitled "System and Method of Providing Traffic Data to a Mobile Device."
USPTO Transaction History of related U.S. Appl. No. 11/967,889, filed Jan. 1, 2008, entitled "System and Method for Accessing a Navigation System."
USPTO Transaction History of related U.S. Appl. No. 12/013,384, filed Jan. 11, 2008, entitled "System and Method to Provide Navigational Assistance Using an Online Social Network."
USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."

USPTO Transaction History of related U.S. Appl. No. 12/016,982, filed Jan. 18, 2008, entitled "Method and Apparatus for Access Point Recording Using a Position Device."

USPTO Transaction History of related U.S. Appl. No. 12/188,139, filed Aug. 7, 2008, entitled "System and Method to Record a Present Trip."

USPTO Transaction History of related U.S. Appl. No. 12/192,018, filed Aug. 14, 2008, entitled "Route Navigation via a Proximity Point."

USPTO Transaction History of related U.S. Appl. No. 12/195,152, filed Aug. 20, 2008, entitled "Systems and Methods for Smart City Search."

* cited by examiner

METHODS AND APPARATUS FOR DETERMINING A ROUTE HAVING AN ESTIMATED MINIMUM FUEL USAGE FOR A VEHICLE

FIELD

The present invention relates to navigation systems and more specifically to navigation systems for suggesting routes for vehicles navigating streets where the suggested routes are based at least partially on fuel efficiency for the vehicle even more specifically the present invention relates to suggesting a route based on at least one estimated speed for the suggested route.

BACKGROUND

Global Positioning Systems ("GPS") enable a device to determine its location on the surface of the Earth. Many systems have been developed that utilize GPS to assist drivers in navigating their vehicles. Before GPS, the driver had a difficult time not only finding a route between their current location and a selected destination, but also in selecting the best route to meet the driver's goals.

One goal some drivers have is to minimize the amount of fuel usage required to travel between the current location and a selected destination. This goal has become even more pronounced with the rising cost of fuel. Finding the street route that will use the minimum fuel usage can be very difficult as it can depend on many factors, including the grade of the streets, the traffic conditions, the number and length of stops in the route, the speed limits of the street route, and the effect of speed on the fuel efficiency of the vehicle. This is further complicated because the exact conditions of the vehicle and the route may not be known. And further, it may be that the driver desires to avoid problems in the route such as dangerous intersections.

U.S. Pat. No. 5,742,922 entitled "Vehicle Navigation System and Method for Selecting a Route According to Fuel Consumption" provides for determining a least fuel consumption route in view of the altitude information of the route, but does not account for the effect of speed on the fuel efficiency of the vehicle and does not account for the usage of fuel for stopping or slowing down to turn.

Accordingly, it would be advantageous to provide methods and apparatus that allow for determining a route having a minimum fuel usage for a vehicle based on the estimated effect of speed on the fuel consumption of the vehicle and estimated speeds for the street route as well as an estimated amount of fuel used based on an estimated number of stops the vehicle will make and an estimated number of times the vehicle will slow down to turn. It would be further advantageous to take into account the driver's preferences for a route.

SUMMARY

It is therefore an object of the present invention to provide a method for a navigation system to determine an estimated minimum fuel usage route for a vehicle based at least on the estimated effect of speed of the vehicle on the efficiency of fuel consumption. In one embodiment, the estimated fuel consumption is further based on the number of estimated stops in a route and on the estimated number of times the vehicle will slow down to turn.

In another embodiment, for example, a method for determining a suggested route having an estimated minimum fuel usage from a start location to a destination location for a vehicle based on estimated fuel efficiency for the vehicle and further based on at least one estimated speed for at least a portion of the route. In some embodiments, the suggested route has constraints placed on it by user preferences. In some embodiments, in addition to route information, real-time information and actual driver behavior data is used in computing the estimated amount of fuel usage.

In another embodiment, an apparatus is illustrated for determining a suggested route having an estimated minimum fuel usage from a start location to a destination location for a vehicle based on estimated fuel efficiency for the vehicle and further based on at least one estimated speed for at least a portion of the route. The apparatus comprises an antenna for receiving signals from GPS satellites, and a GPS operable to determine the current location of the vehicle based on the received signals from the GPS satellites. The apparatus further comprises a navigation system having a route determiner operable to determine the suggested route based on estimated fuel efficiency for the vehicle and further based on at least one estimated speed for at least a portion of the route. The estimated fuel efficiency for the vehicle is based on at least aggregated data for the vehicle or at least on aggregated data for the class of vehicle.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
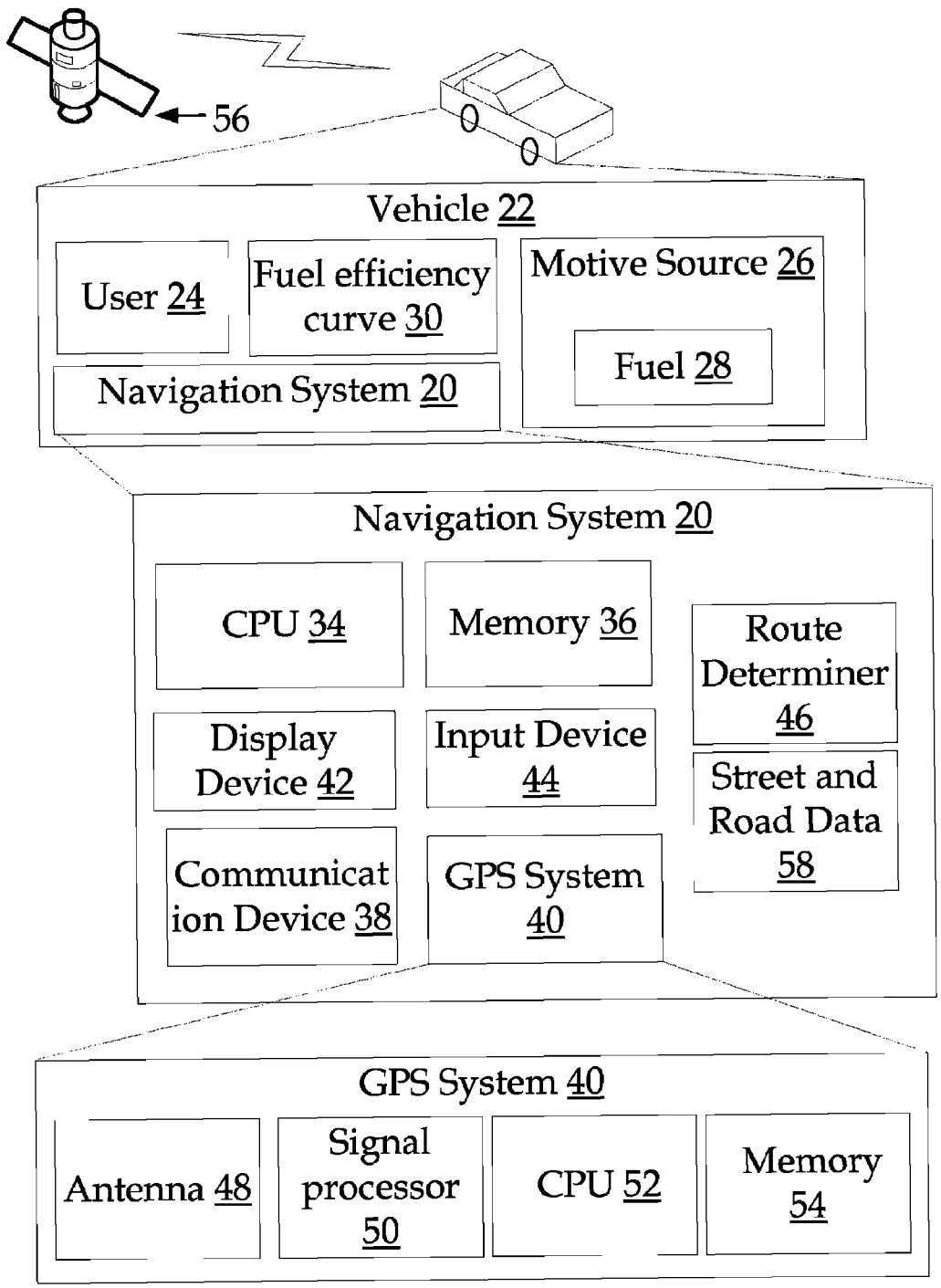
FIG. 1 is a representative diagram of one embodiment of a navigation system for determining a route having an estimated minimum fuel usage.

FIG. 1 depicts one embodiment of a navigation system 20 situated in a vehicle 22 for determining a suggested route having an estimated minimum fuel usage based at least on an estimated effect of speed of the vehicle on the efficiency of fuel consumption. In some embodiments, the navigation system 20 determines the suggested route further based on the number of estimated stops in a route and the estimated number of times the vehicle will slow down to turn.

The vehicle 22 is a means of transport on land such as a passenger car, sport utility vehicle, truck, scooter, or motorcycle. The vehicle 22 includes a user 24, a motive source 26, a fuel 28, and a fuel efficiency curve 30. The user 24 is a person such as the driver of the vehicle 22 or a passenger of the vehicle 22. Alternatively, in other embodiments the user 24 is remotely located from the vehicle 22 and communicates remotely with the navigation system 20. For example, the user 24 can be a person remotely located assisting the driver of the vehicle 22 in navigating the vehicle 22. The motive source 26 is an internal combustion engine running on gasoline, or one of the many alternatives such as an electric motor using electricity. The motive source 26 uses the fuel 28. For an internal combustion engine the fuel 28 is gasoline, or a substitute or alternative such as diesel gasoline, alcohol, ethanol, hydrogen, natural gas, etc. For an electric motor the fuel 28 is a battery or alternatively a fuel cell. The fuel efficiency curve 30 is how efficiently the motive source 26 uses the fuel 28 to propel the vehicle 22 at different speeds of the vehicle 22. For example, a typical passenger car might get 30 miles/gallon for a speed of 55 miles/hour, but only get 20 miles/gallon for a speed of 85 miles/hour. The fuel efficiency curve 30 in this case would have miles/gallon on the vertical axis and miles/hour on the horizontal axis. There are many reasons why the efficiency of the motive source 26 varies depending on the speed of the vehicle 22. The reasons include reasons inherent to the design of the motive source 26, reasons inherent to the design of the fuel 28, e.g. a battery, reasons inherent to the design of the vehicle 22, and reasons inherent to the physics of moving a vehicle 22 on the surface of the earth, including wind resistance.

The navigation system 20 includes a CPU 34, a memory 36, a communication device 38, a GPS system 40, a display device 42, and an input device 44, all of which are communicatively coupled with one each other. In some embodiments, the communication device 38 and/or the GPS system 40 are not included. The navigation system 20 further includes a route determiner 46 disposed in the memory 36 and a street and road data 46 disposed in the memory 36. The CPU 34 is a central processing unit ("CPU"), or alternatively any device disposed for processing the instructions and data contained in the memory 36. The memory 36 is random access memory ("RAM"), and non-volatile storage of read-only memory ("ROM"), or alternatively a hard-disk, or flash memory. Alternatively, the memory 36 is remotely located and accessed by the navigation system 20 by using the communication device 38. The communication device 38 has an antenna and electronics for transmitting and receiving signals such as GSM, or alternatively a local area network (LAN) signals such as 802.11. Alternatively, the communication device 38 is shared with the GPS system 40. For example, in an embodiment, there is only a single antenna shared by the navigation system 20 and the GPS system 40. The display device 42 is an LCD display within the vehicle 22 or alternatively a speaker giving voice commands. The input device 44 is a touch screen or alternatively a microphone with the CPU 34 disposed for voice recognition, or input device can be a keyboard. Further, in some embodiments the display device 42 and the input device 44 can be remotely located and in communication with the navigation system 20 over the communication device 38. For example, the display device 42 can be a home computer LCD monitor and the input device 44 can be the mouse on the home computer with a friend of the driver of the vehicle 22 remotely aiding the driver in navigating the vehicle 22.

The GPS system 40 includes an antenna 48, a signal processor 50, CPU 52, and a memory 54. GPS systems 40 are well-known in the art. The antenna 48 is for receiving signals from the GPS satellite constellation 60. The signal processor 50 is for processing the signals received from the GPS satellite constellation 60 into a digital format that the CPU 52 can process. The GPS system 40 includes a separate CPU 52 and memory 54 enabled to process the signals received from the satellite constellation 60 and calculate a location on the surface of the Earth based on the received signals. Alternatively, the GPS system 40 shares one or more of the antenna 48, the signal process 50, the CPU 52, and the memory 54, with the navigation system 20.

Figure 2:
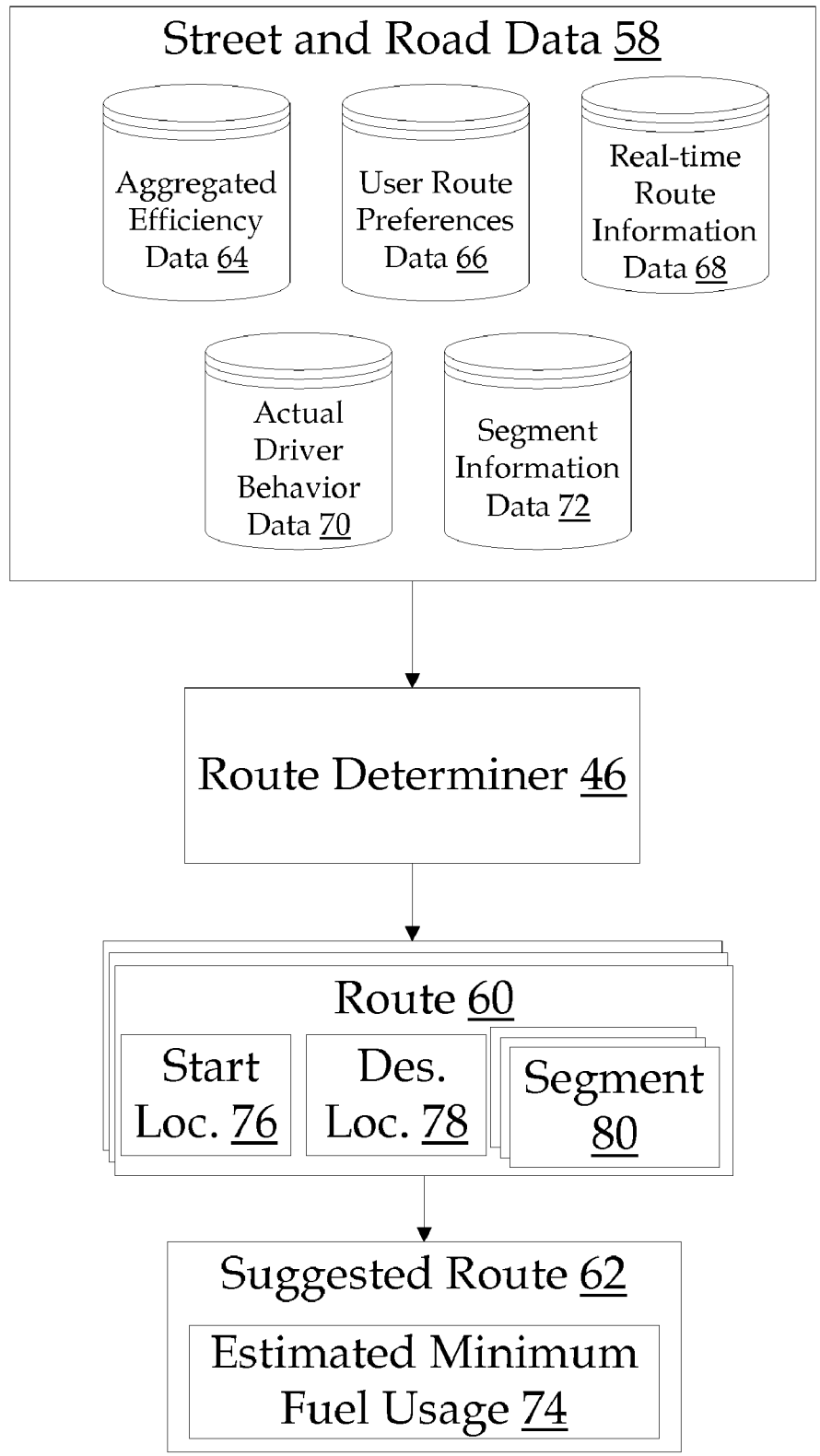
FIG. 2 is a representative diagram of one embodiment of the navigation system of FIG. 1.

FIG. 2 depicts the street and road data 58, the route determiner 46, a route 60, and a suggested route 62. The street and road data 58 includes an aggregated efficiency data 64, a user route preferences data 62, a real-time route information data 64, a segment information data 66, and an actual driver behavior data 70. It should be understood that although street and road data 58 is depicted as having a particular organization for ease of discussion that the data itself may be organized differently. For example, in some embodiments all the data in street and road data 58 resides in a single database.

The aggregated efficiency data 64 includes efficiency data that is not specific to the particular vehicle 22, but rather based on aggregated efficiency data 64 for the vehicle 22, such as the year the vehicle 22 was manufactured, or the number of cylinders of the vehicle 22, or the make and the model of the vehicle 22. Table 4 below is an example of aggregated efficiency data 64 showing the estimated fuel efficiency curves 30 for vehicles 22 manufactured in the years 1973, 1984, or 1997. The aggregated efficiency data 64 is used to approximate the fuel efficiency curve 30 for the vehicle 22. User route preferences data 66 includes, but is not necessarily limited to, data relevant to user route preferences such as whether the user 24 would like to avoid dangerous intersection, whether the user 24 would like to avoid frequent stops, and whether the user 24 would like to avoid highways or backstreets. Real-time route information data 68 includes current traffic conditions, current accident reports, weather information, current construction sites, etc. Actual driver behavior data 70 includes data collected from the driving behavior of a user 20 such as whether a user 20 regularly speeds, whether the user 20 accelerates fast and thus uses more fuel in a stop then a typical driver, etc. Segment information data 72 includes the speed limit of streets, the direction of travel for streets, whether there is a stop sign or stop light at an intersection, bends in streets, length of streets, whether a vehicle 22 will need to slow down to turn, whether a vehicle will have to slow down due to a bend in the street, etc. The data 64, 66, 68, 70, 72 is locally stored, or in the alternative the data 64, 66, 68, 70, 72 can be remotely stored. In some embodiments, the data 64, 66, 68, 70, 72 is partially stored locally and partially stored remotely.

The route 60 is a route from a start location 76 of a vehicle 22 to a destination location 78 for the vehicle 22 having one or more of a segment 80. The start location 76 and the destination location 78 are places on the surface of the Earth. The segment 80 is a street, road, turnpike, or other path for a vehicle with a speed limit. In some embodiments, the speed limit for a segment 80 is estimated based on data in street and road data 58. The route 60 may contain turn information between two of the segments 80 and information regarding the intersection between two of the segments 80.

The suggested route 62 is a selected one of one or more of the routes 60 having an estimated minimum fuel usage 74. The estimated minimum fuel usage 74 is calculated by the route determiner 46. In some embodiments the estimated minimum fuel usage 74 is discarded and only the suggested route 62 is retained.

The route determiner 46 determines the suggested route 62 having an estimated minimum fuel usage 74 from a start location 76 of a vehicle 22 to a destination location 78 for the vehicle 22 based on estimated fuel efficiency for the vehicle 22 and further based on at least one estimated speed for the vehicle 22 for at least one segment 80 of the suggested route 62.

The route determiner 46 is arranged to determine the start location 76 for the vehicle 22 by receiving input from the user 24 of the navigation system 20 using the input device 44 or in the alternative the route determiner 46 can determine a start location 76 for the vehicle 22 by receiving the current location from the GPS system 40. The route determiner 46 is arranged to receive the destination location 78 for the vehicle 22 from the user 24 using the input device 44.

In some embodiments, the route determiner 46 determines the route 60 by developing partial routes from both the start location 76 and the destination location 78, always keeping the lower fuel use partial routes as the partial routes are expanded. Eventually the partial routes that started from the destination location 78 and the partial routes that started from the start location 76 meet to form complete routes 60 and these complete routes 60 are used to choose the suggested route 62 having the estimated minimum fuel usage 74. The route determiner 46 uses the data in segment information data 72 for estimating the number of stops and the estimated speed, and the estimated number of times the vehicle 22 will slow down to turn, and the estimated number of times the vehicle 22 will slow down due to a bend in the segment 80. The route determiner 46 uses the data in aggregated efficiency data 64 for estimating the fuel efficiency of the vehicle 22 which is based on aggregated data for the vehicle 22. Table 4 is an example of the type of data that is in aggregated efficiency data 64 and which is used to estimate the amount of fuel the vehicle 22 will use for a route 60. Alternatively, the route determiner 46 uses data gathered from the operation of the vehicle 22 for estimating the fuel efficiency of the vehicle 22. After the suggested route 62 is determined, preferably, the route determiner 46 displays turn-by-turn instructions on display device 42, guiding the driver of the vehicle 22 to the destination location 78. In some embodiments, the route determiner 46 is arranged to continuously display on the display device 42 a recommended speed for the vehicle 22 to travel in order to attain the estimated minimum fuel usage 74 that was calculated for the suggested route 62. In some embodiments, the route determiner 46 is arranged to continuously recalculate a new suggested route 62 based on the current location of the vehicle 22.

In some embodiments, the route determiner 46 is arranged to adjust calculations based on actual driver behavior data 70 in building the route 60. For example, the route determiner 46 uses the speed limit of a segment 80 plus 10 miles per hour for the estimated speed in calculating the estimated amount of fuel that will be used for a user 22 that typically speeds 10 miles per hour over the speed limit. In some embodiments, the route determiner 46 is arranged to output for consumption by the user 22 a list of driving styles, for example "like to speed", "don't usually speed", etc., and receive from the input device 44 a selected driving style from the user 24, and then determine the suggested route 62 based on this received driving style by basing calculations of estimated fuel usage using the received driving style of the user 24. In some embodiments, the route determiner 46 is arranged to build the route 60 based on the real-time route information 68 by adjusting the estimated fuel usage for segments 80 with traffic delays. In some embodiments, the route determiner 46 is arranged to adjust the estimated speed of segments based on the use of real time route information 68. In some embodiments, real time route information 68 includes historical route traffic information. In some embodiments, the route determiner 46 is arranged to reject one or more of the segment 80 or to add fuel usage to one or more of the segment 80 based on the user route preferences data 66. For example, if a user 24 chooses to avoid dangerous intersections, the route determiner 46 will then in some embodiments not include a segment 80 if that segment 80 includes a dangerous intersection. In another example, the route determiner 46 only chooses a route 60 that does not include traveling on highways.

Figure 3:
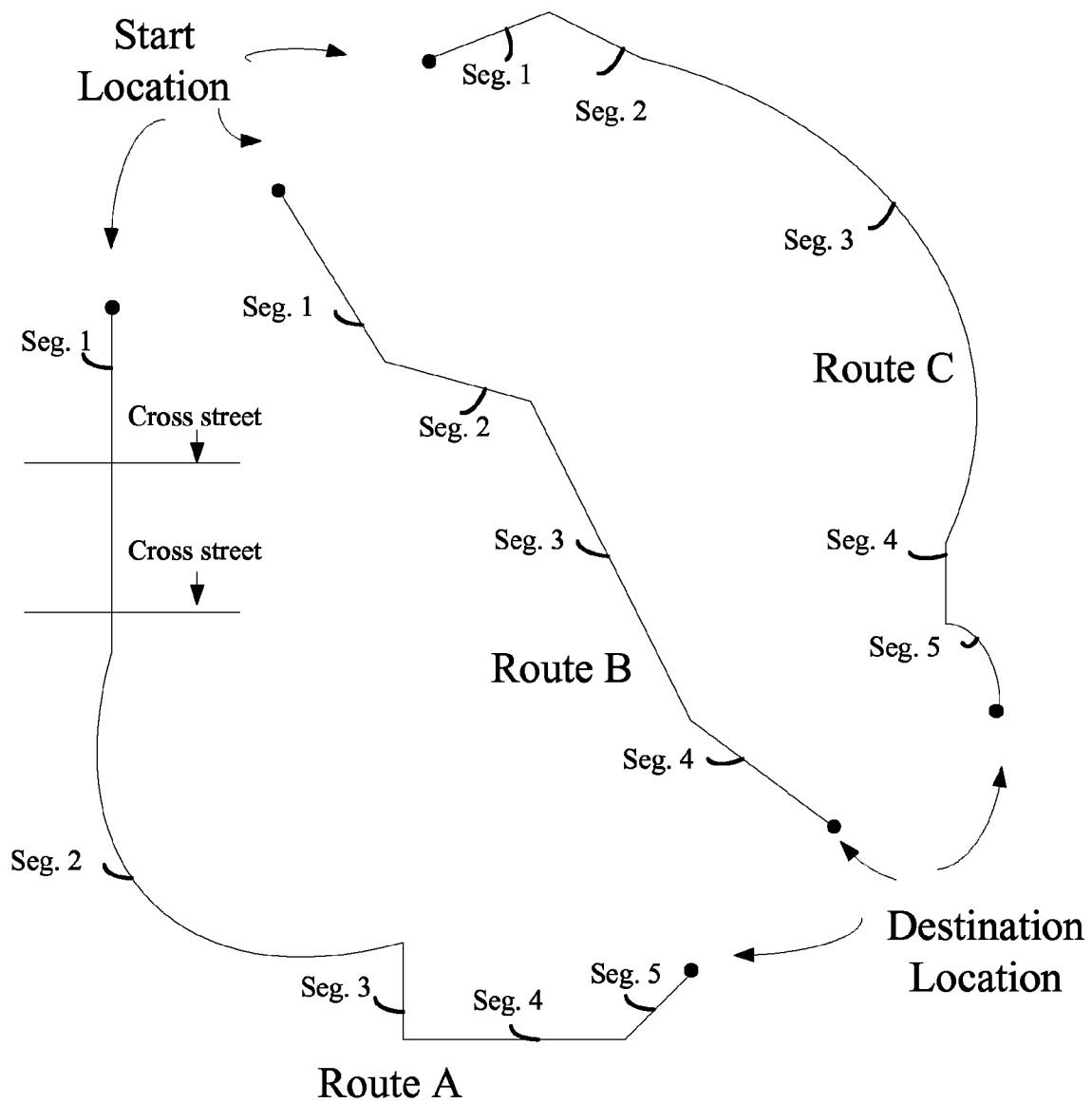
FIG. 3 is a schematic diagram of an example of three routes having segments and nodes with a start location and a destination location.

FIG. 3 depicts an example of three possible routes route A, route B, and route C from a start location to a destination location. Route A has 5 segments. Route B has 4 segments. Route C has 5 segments. The three routes are alternatives for the route determiner 46 to select from in determining a suggested route 62 having an estimated minimum fuel usage 74 from the start location to the destination location. Table 1 depicts information for route A. The information in Table 1 is stored in segment information data 72.

TABLE 1

Route A Determination

| Segment | Length (miles) | Extra Nodes | Speed m/hr | Time | Fuel |
|---|---|---|---|---|---|
| 1 | 8 | 2 | 35 | 0.2305 | 0.4230 |
| 2 | 7 | 0 | 35 | 0.2013 | 0.3243 |
| 3 | 1 | 0 | 35 | 0.0299 | 0.1320 |
| 4 | 3 | 0 | 35 | 0.0873 | 0.2294 |
| 5 | 1 | 1 | 25 | 0.0413 | 0.1327 |
| Totals: | 20 | | | 0.5906 | 1.2417 |

Referring to Table 1 and to FIG. 3, route A has 5 segments forming a route from the start location to the destination location. A segment in this embodiment is a street or multiple streets that have the same speed limit and do not include a right or left turn. Segment 1 of route A is 8 miles long and has 2 extra nodes or cross streets (illustrated in FIG. 3) and has a speed limit of 35 miles per hour. An extra node is a cross street, where it is not known whether or not the vehicle 22 will have to stop at the cross street or not. The total length of the 5 segments in Route A is 20 miles. The route determiner 46 determines the "Time" column of Table 1. The "Time" column is an estimated time for the vehicle 22 to travel the segment. For example, referring to Table 1, the route determiner 46 estimates that it will take the vehicle 22 0.2305 hours to travel segment 1. The "Fuel" column of Table 1 refers to an estimated amount of fuel for the vehicle 22 to travel segment 1 as calculated by the route determiner 46. For example, the route determiner 46 estimates that it will take the vehicle 22 0.4280 fuel units to travel segment 1. Fuel units are used rather than a specific unit of measure such as gallons since in this case the estimates for fuel use are based on aggregated data for the vehicle that includes data for vehicles that have different weights. It turns out that the fuel efficiency curve 30 has the same shape for different vehicles manufactured in the same year, but due to the weight differences of the vehicles the absolute values of fuel use are different, therefore to compensate a relative measure of fuel use is used by the route determiner 46.

Table 2 and FIG. 3 is information regarding route B, having segment 1, segment 2, segment 3, and segment 4.

TABLE 2

Route B Determination

| Segment | Length (miles) | Extra Nodes | Speed m/hr | Time | Fuel |
|---|---|---|---|---|---|
| 1 | 3.5 | 3 | 25 | 0.1422 | 0.3147 |
| 2 | 0.5 | 1 | 35 | 0.0187 | 0.1493 |
| 3 | 10 | 5 | 35 | 0.2884 | 0.5871 |
| 4 | 2 | 1 | 25 | 0.0816 | 0.2655 |
| Totals: | 16 | | | 0.5311 | 1.3168 |

Table 3 and FIG. 3 is information regarding route C, having segment 1, segment 2, segment 3, segment 4, and segment 5.

TABLE 3

Route C Determination

| Segment | Length (miles) | Extra Nodes | Speed m/hr | Time | Fuel |
|---|---|---|---|---|---|
| 1 | 1 | 0 | 35 | 0.0299 | 0.1320 |
| 2 | 1.5 | 0 | 25 | 0.0613 | 0.1491 |
| 3 | 22 | 0 | 65 | 0.3398 | 0.8534 |
| 4 | 0.75 | 0 | 25 | 0.0313 | 0.1245 |
| 5 | 2 | 1 | 35 | 0.0588 | 0.1989 |
| Totals: | 27.25 | | | 0.5213 | 1.4581 |

The route determiner 46 will determine which of the three candidate routes A, B, and C from the start location 76 to the destination location 78, has the estimated minimum fuel usage 74 for a vehicle 22.

Table 4 illustrates expected miles per gallon for a typical vehicle 22 manufactured in 1973, 1984, and 1997. The data in Table 4 is stored in aggregated efficiency data 64.

TABLE 4

Expected mile/gallon for a typical vehicle manufactured in 1973, 1984, and 1997

| Speed (Miles/hour) | 1973 | 1984 | 1997 | |
|---|---|---|---|---|
| 15 | d | 21.1 | 24.4 | |
| 20 | d | 25.5 | 27.9 | |
| 25 | d | 30.0 | 30.5 | ←92 |
| 30 | 21.1 | 31.8 | 31.7 | |
| 35 | 21.1 | 33.6 | 31.2 | ←94 |
| 40 | 21.1 | 33.6 | 31.0 | |
| 45 | 20.3 | 33.5 | 31.6 | |
| 50 | 19.5 | 31.9 | 32.4 | |
| 55 | 18.5 | 30.3 | 32.4 | |
| 60 | 17.5 | 27.6 | 31.4 | |
| 65 | 16.2 | 24.9 | 29.2 | ←96 |
| 70 | 14.9 | 22.5 | 26.8 | |
| 75 | d | 20.0 | 24.8 | |

For example, for a 1997 vehicle 22 the estimated fuel efficiency is 30.5 miles/fuel unit 92 for a speed of 25 miles/hour; 31.2 miles/fuel unit 94 for a speed of 35 miles/hour; and, 29.2 miles/fuel unit 96 for a speed of 65 miles/hour. The estimated fuel efficiency is for a typical vehicle 22 manufactured in 1973, 1984, or 1997. This data is then being used to estimate the actual fuel efficiency curve 30 of the vehicle 22. For this example, we assume the vehicle 22 was manufactured in 1997.

The aggregated data in Table 4 is for a typical vehicle 22 manufactured in 1997, where relative measures of fuel efficiency were aggregated. The reason relative data was aggregated rather than absolute data is partially due to the differences in vehicle weight. When using this data for comparing routes A, B, and C, the relative estimated fuel consumed is compared by the route determiner 46. For example, for a 1997 vehicle 22 the estimated fuel efficiency for 15 miles/hour is 24.4 miles/gallon and the estimated fuel efficiency for 55 miles/hour is 32.4, so for any particular 1997 vehicle 22, the fuel efficiency can be compared between the two speeds with, (32.4/24.4)*100, or a 1997 vehicle 22 is estimated to be 133 percent more efficient using fuel at 55 miles per hour than at 15 miles per hour.

Figure 4:
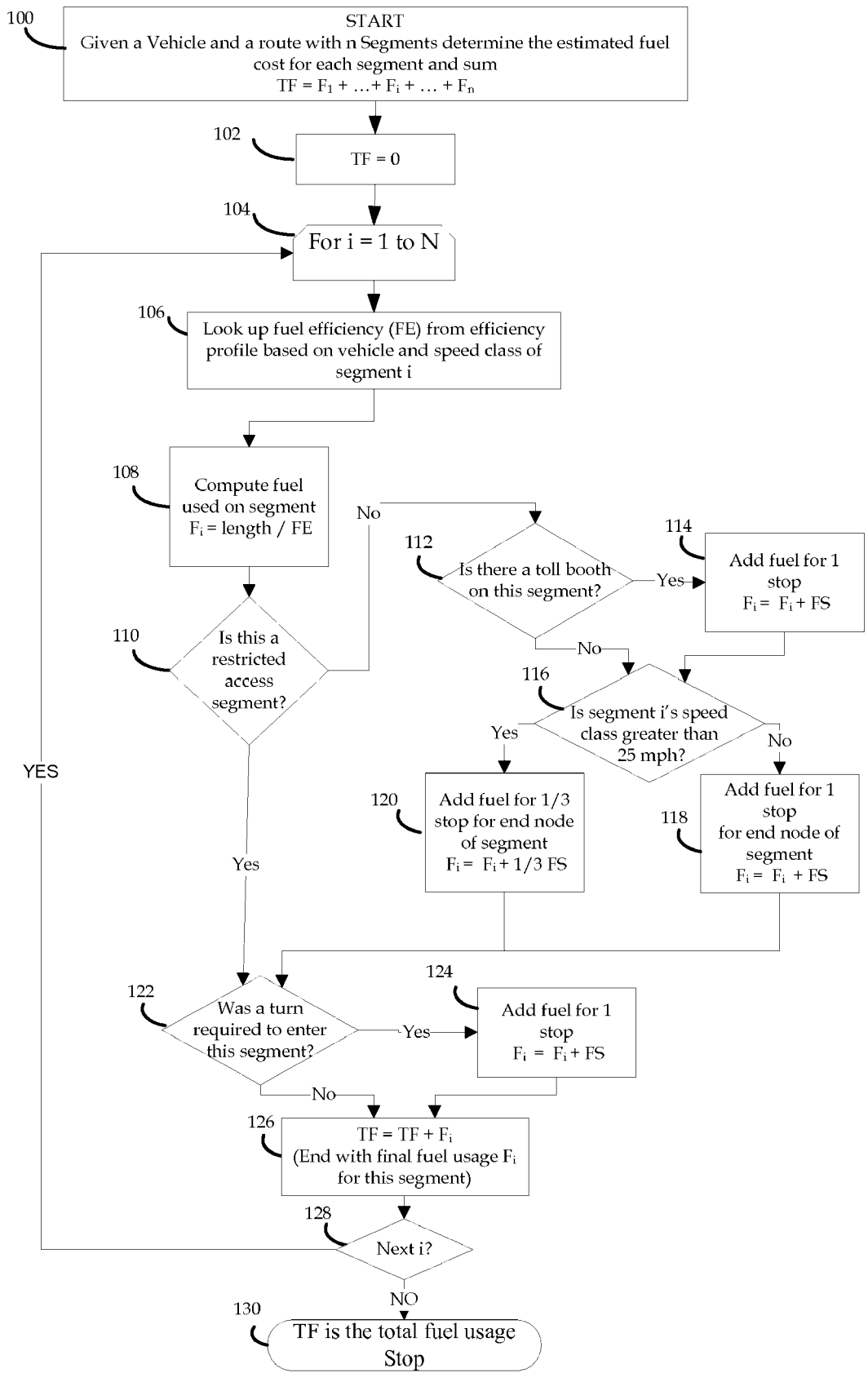
FIG. 4 is a flow chart of an illustrative example of using the route determiner of FIG. 1 for determining a route having an estimated minimum fuel usage.

FIG. 4 depicts a flow chart of an illustrative example of using the route determiner 46. The route determiner 46 estimates a relative amount of fuel usage for the vehicle 22 for a route 60 having n segments 80, based on the estimated fuel efficiency for different speeds of the vehicle 22 from Table 4 and estimated speeds for the routes 60 using Table 1, Table 2, Table 3, and based on the number of nodes (cross streets where it is not known whether the vehicle will have to stop) in a route 60 using Table 1, Table 2, Table 3, the number of turns in a route 60, the number of toll booths in a route 60, and the number of estimated stops in a route 60, where the number of estimated stops is estimated based on the speed limits of the segment 80.

The numbers in the column "Fuel" of Tables 1, 2, and 3 represent the application of the embodiment of route determiner 46 depicted in FIG. 4.

Applying the embodiment of route determiner 46 depicted in FIG. 4, the flow starts with step 100, where a statement of the problem to be solved is given a vehicle 22 and a route or route 60 with n segments route determiner 46 determines the estimated fuel cost for each segment and sums the values for each segment, $TF=F_1+\ldots+F_i+\ldots+F_n$, to get the estimated fuel usage for the route or route 60.

For route A there are 5 segments depicted in FIG. 3, and as illustrated in Table 1. For this example the vehicle 22 was manufactured in 1997. The method continues in FIG. 4 with step 102 $TF=0$. The total fuel estimate is set to zero. The method continues in step 104, for i=1 to n. The route determiner 46 will do the following statements for each segment of the route A where i will be the current segment. In step 106, look up fuel efficiency ("FE") which is based on vehicle 22 and speed of segment 1 of route A. Table 1 represents that the estimated speed, here the speed limit, for segment 1 of route A is 35 mile/hour. Table 4 represents that the estimated fuel efficiency for a 1997 vehicle 22 at a speed of 35 miles/hour is 31.2 miles/fuel unit. In step 108, estimated fuel used on segment 1 ($F_1$) is determined by $F_1$=(length of segment 1)/FE (calculated in step 206). Table 1 represents that the length of segment 1 of route A is 8 miles, so $F_1$=8 miles/31.2 miles/fuel unit, so $F_1$=0.256 as depicted in Table 1 for segment 1. In step 110 it is determined whether this is a restricted access segment?. Segment 1 of route A is not a restricted access segment (from Table 1). In step 112, it is determined whether there is a toll booth on this segment? Segment 1 of route A does not a toll booth (from Table 1). In step 116, it is determined whether segment 1's speed class is greater than 25 mph? Segment 1 of route A speed class is 35 mph (from Table 1), so the answer is yes. The speed is being used here to estimate the number of stops in that it is not known if there is a stop sign or light at an intersection, but a heuristic is used based on the speed limit of the segment. The method continues in step 120, add fuel for ⅓ stop for each node (a node is a cross street as represented on FIG. 3) of segment 1, $F_1=F_1+⅓$ FS. A node is an intersection, where the vehicle 22 may have to stop. An estimate is being used that ⅓ of the time the vehicle 22 will have to stop at an intersection for a speed of a segment greater than 25 mph, so Table 1 represents that segment 1 of route A has 2 nodes, here we use the value of 0.1 for fuel stop ("FS") as an estimate of the fuel the vehicle 22 would use to stop and start, so $F_1=0.256+\frac{2}{3}*0.1=0.256+0.0666=0.323$. The method continues in step 122, was a turn required to enter this segment? There was a turn required to enter segment 1 of route A. This information is represented in FIG. 3, and may be contained in segment information data 72 (FIG. 2.) The method continues in step 124, add fuel for 1 stop $F_1=F_1+FS$. So, $F_1=0.323+FS$, or $F_1=0.323+0.1=0.423$. The method continues in step 126, end with final fuel usage for this segment in $F_i$, so $TF=TF+F_1$. That is we add the fuel usage $F_i$ estimate for this segment to the total estimate for route A. Here, $F_1=0.423$ as just calculated and as represented in Table 1 for segment 1 of route A. The method continues in step 128, Next I? Since i=1 currently and there are 5 segments in route A, the answer is yes. The method continues back to step 104 where i is incremented to 2 and then $F_2$ is calculated in a similar manner as $F_1$ was just calculated. The method continues through each remaining segment 2, 3, 4, 5 and then the estimated fuel for each segment is added to give 1.2417 as depicted in Table 1 for route A. This relative fuel usage estimate for route A can then be compared to the relative fuel usage estimate of route B, 1.3168 from Table 2 and to route C 1.4581 from Table 3. Route A, then has the least estimated fuel usage and so the route determiner 46 would assign route A as the suggested route 62 having the estimated minimum fuel usage 74.

Note that route B illustrated in Table 2 is the shortest in length at 16 miles, but uses more fuel than route A illustrated in Table 1. And note that Route C illustrated in Table 3 has the fastest estimated time at 0.5213 hours, compared to 0.5906 hours for Route A.

Figure 5:
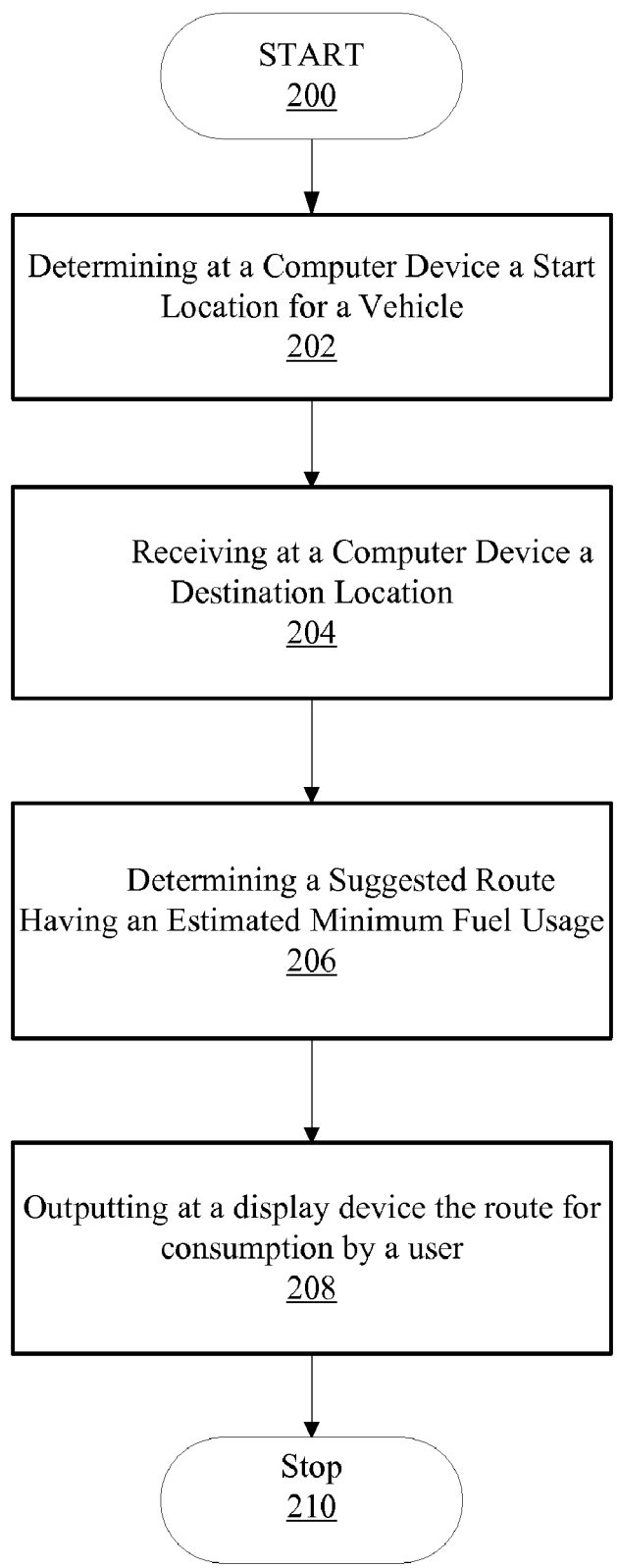
FIG. 5 is a flowchart of one embodiment of a method on an apparatus for determining a route having an estimated minimum fuel usage.

FIG. 5 depicts an embodiment of a method that is performed by the system of FIG. 1 for determining a suggested route 62 having an estimated minimum fuel usage 74. The flow starts at Block 200. The flow continues with Block 202 determining at a computer device a start location 76 for a vehicle 22. This is accomplished by the GPS system 40 of FIG. 1, or in another embodiment received from a user 24. The flow proceeds to Block 204 receiving at a computer device a destination location 78. In an embodiment, the destination location 78 is received from an input device 44 by the user 24. In other embodiments, the destination location 78 is received across a communication link. The flow proceeds to Block 206 determining a suggested route 62 having an estimated minimum fuel usage 74 from the start location 76 to the destination location 78 for the vehicle 22 based on estimated fuel efficiency for the vehicle 22 and further based on at least one estimated speed for at least a portion of the route 60. The suggested route 62 is be determined locally by the navigation system 20 of the vehicle 22, or alternatively it is determined across a communication device 38. The estimated fuel efficiency of the vehicle 22 is based on the year the vehicle 22 was manufactured or the number of cylinders of the vehicle 22, or on the make and model of the vehicle 22, or another source of information such as historical fuel usage, measured fuel usage, etc. The flow proceeds to Block 208 to outputting at a display device 42 the route for consumption by a user 24. The suggested route 62 is displayed on the display device 42 in street by street directions. Alternatively, the suggested route 62 could be communicated to the user 24 by use of a speaker.

It should now be apparent that a navigation system has been described that determines an estimated minimum fuel usage route 74 from a start location 76 to a destination location 78 for a vehicle 22 based at least on the estimated effect of speed of the vehicle on the efficiency of fuel consumption.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of determining a route for a vehicle having a motive source, comprising the steps of:
   inputting a start location;
   receiving at a computer device a destination location;
   determining at the computer device a suggested route having an estimated minimum fuel usage from the start location to the destination location for the vehicle based on estimated fuel efficiency for the vehicle for different speeds of the vehicle and further based on at least one estimated speed for at least a portion of the route;
   outputting at the computer device a list of a plurality of driving styles for consumption by a user;
   receiving at the computer device a selected driving style from the user;
   determining the suggested route partially based on the received driving style; and
   outputting at the computer device the route for consumption by the user.

2. The method of claim 1, further comprising inputting a start location by determining at the computer device the start location for the vehicle based on received signals from a GPS system.

3. The method of claim 1, further comprising inputting a start location at an input device by a user.

4. The method of claim 1, wherein the step of determining a suggested route further comprises determining based on the number of estimated stops in a route and further based on the estimated number of times the vehicle will slow down to turn, and further based on the estimated number of times the vehicle will slow down due to a bend in a portion of the route.

5. The method of claim 1, further comprising the step of receiving at the computer device a user route preference, and further comprising determining the suggested route based at least partially on the user route preference, wherein the user route preference is at least one of: not including dangerous intersections in the route, not including highways in the route, not including toll roads, and not including street with less than a minimum speed limit.

6. The method of claim 1, wherein the estimated fuel efficiency for the vehicle is based on at least one of: the number of cylinders in the vehicle, the year the vehicle was manufactured, historical data for the vehicle, measured data for the vehicle, and the vehicle type classification.

7. The method of claim 1, wherein the step of determining a suggested route further comprises determining based on the number of turns in a route, the number of toll booths in a route, and the number of estimated stops in a route, wherein the number of estimated stops is determined based on the speed limits of the route, if the stop information for an intersection is not available in the database.

8. The method of claim 1, wherein the step of determining a suggested route further comprises determining based on the grade of the route.

9. The method of claim 1, further comprising the step of determining a suggested route based on the fuel type the vehicle is using, wherein the fuel type is selected from unleaded, premium, alcohol, or diesel.

10. The method of claim 1, further comprising the step of determining a suggested route at least partially based on actual driving behavior for a driver of the vehicle.

11. The method of claim 10, wherein the actual driving behavior of the driver of the vehicle is at least one of whether the driver speeds, whether the driver accelerates faster than an average acceleration, whether the driver drives slower than the speed limit a greater amount of time than an average amount of time of driving slower than the speed limit, and whether the driver applies the brakes more frequently than an average number of applications of the brakes.

12. The method of claim 1, further comprising the step of determining a suggested route at least partially based on real-time information, wherein the real-time information comprises at least one of current traffic conditions, and time of day variations of traffic regulations.

13. The method of claim 1, further comprising the step of continuously outputting at the computer device a recommended speed for the vehicle, wherein the recommended speed is based on the current speed limit, the estimated fuel efficiency of the vehicle, and an estimated fuel usage for the route from the start location to the destination location.

14. The method of claim 1, further comprising the steps of:
monitoring actual speed of the vehicle;
determining a current location for the vehicle based on receiving signals from a GPS system;
determining a new suggested route having a minimum fuel usage from the current location to the destination location for the vehicle, if the actual fuel usage is greater than the estimated fuel usage for the route from the start location to the destination location;
outputting at the computer device the new suggested route for consumption by a user.

15. The method of claim 1, further comprising the steps of:
measuring actual fuel efficiency for the vehicle;
determining a new suggested route from the current location to the destination location for the vehicle based on the measured fuel efficiency for the vehicle.

16. The method of claim 1, further comprising the steps of determining a suggested route at least partially based on estimating the fuel usage for a route by estimating the number of stops at intersections the vehicle will make based on at least one estimated speed for at least a portion of the route.

17. An apparatus for determining a suggested route for a vehicle, comprising:

an antenna for receiving signals from GPS satellites;
a GPS system communicatively coupled to the antenna operable to determine current location for the vehicle based on received signals from GPS satellites;
an input device communicatively coupled to the GPS system operable to receive a destination location from a user and to receive a selected driving style from the user, the driving style being selected from a list of a plurality of driving styles;
a navigation system having a route determiner operable to determine a suggested route having an estimated minimum fuel usage from a start location to the destination location for the vehicle based on estimated fuel efficiency for the vehicle for different speeds of the vehicle, at least one estimated speed for at least a portion of the route, and the received driving style; and
an output computer device operable to output the suggested route for consumption by the user.

18. The apparatus of claim 17, wherein the start location is the current location of the vehicle determined by the GPS system.

19. The apparatus of claim 17, wherein the start location is input by the user at the input device.

20. A memory or a computer-readable medium storing instructions which, when executed by a processor, cause the processor to perform the method of
determining at a computer device a start location for a vehicle;
receiving at the computer device a destination location;
determining at the computer device a suggested route having an estimated minimum fuel usage from the start location to the destination location for the vehicle based on estimated fuel efficiency for the vehicle for different speeds and further based on at least one estimated speed for at least a portion of the route;
outputting at the computer device a list of a plurality of driving styles for consumption by a user;
receiving at the computer device a selected driving style from the user;
determining the suggested route partially based on the received driving style; and
outputting at the computer device the route for consumption by the user.

* * * * *